No. 893,475.

PATENTED JULY 14, 1908.

J. F. GERO.
HOSE CLAMP.
APPLICATION FILED FEB. 7, 1908.

WITNESSES:

INVENTOR
J. F. Gero

BY
W. J. Fitzgerald & Co.
Attorneys

UNITED STATES PATENT OFFICE.

JOHN FRANCIS GERO, OF NEWARK, OHIO.

HOSE-CLAMP.

No. 893,475.    Specification of Letters Patent.    Patented July 14, 1908.

Application filed February 7, 1908. Serial No. 414,801.

*To all whom it may concern:*

Be it known that I, JOHN FRANCIS GERO, a citizen of the United States, residing at Newark, in the county of Licking and State of Ohio, have invented certain new and useful Improvements in Hose-Clamps; and I do hereby declare the following to be a full, clear, and exact description of the invention, such as will enable others skilled in the art to which it appertains to make and use the same.

My invention relates to new and useful improvements in hose clamps and is adapted more particularly to be used for securing the ends of coupling members to the ends of the hose sections, such as are used for conveying air to air brakes on railway cars and my object is to provide a clamp of this class, which will direct uniform pressure entirely around the hose.

A further object is to provide means for securing the clamp on the hose and a still further object is to provide means for preventing buckling of the hose between the sections of the clamp.

Other objects and advantages will be hereinafter referred to and more particularly pointed out in the claims.

Figure 1:
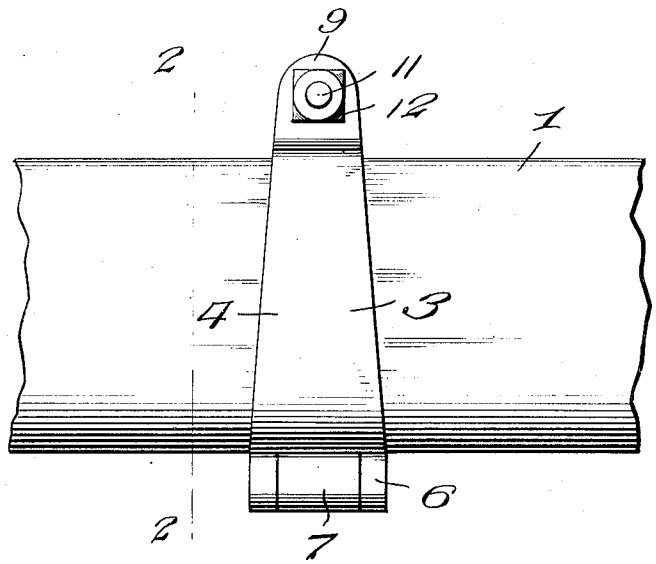
Figure 2:
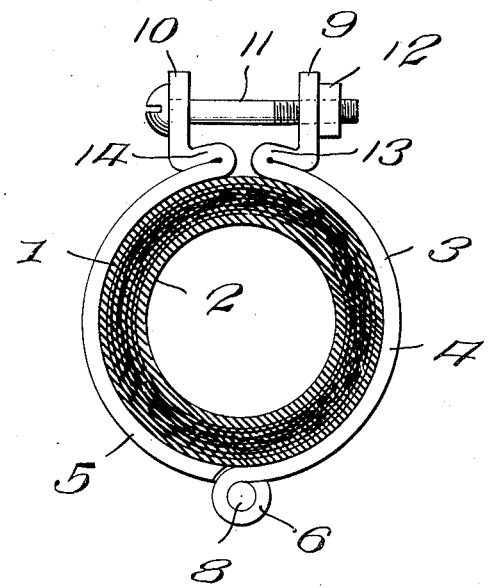

In the accompanying drawings which are made a part of this application, Figure 1 is a side elevation of a section of hose showing my improved clamp applied to use, and, Fig. 2 is a sectional view thereof, as seen on line 2—2, Fig. 1.

Referring to the drawings in which similar reference numerals designate corresponding parts throughout the several views, 1 indicates a hose, which is constructed in the usual or any preferred manner, and 2 indicates the tubular shank of the usual form of coupling employed to secure the ends of air conveying pipes together.

The shank 2 is introduced into one end of the hose and the hose secured therearound by means of my improved clamp 3, said clamp consisting of a pair of substantially semicircular sections 4 and 5, which sections are provided at one end with alining sockets 6 and 7, respectively, through which extends a pivot pin 8 and by which means said sections are hingedly secured together.

The free ends of the sections 4 and 5 are bent outwardly and upwardly to form ears 9 and 10, said ears being spaced a distance apart and adapted to receive a bolt 11, which bolt extends through alining openings in said ears and is threaded at one end to receive a nut 12, whereby said ears may be drawn towards each other and the sections 4 and 5 securely clamped around the hose.

By bending outwardly the ends of the sections 4 and 5 and forcing the same downwardly onto the outer faces of the sections, strong and durable terminals 13 and 14 are formed, the length of said terminals inwardly from the ears, being such as to bring the ends of the sections substantially together when clamped on the hose, thereby holding the hose against buckling or bulging between the terminals and at the same time extending the ears 9 and 10 a sufficient distance apart to readily obtain a leverage in drawing the ends of the sections together.

In conjunction with securing the hose to the shank, my improved clamp may be also used for clamping a patch over a leak in the hose, and when so used, the clamp is located at the point of leakage and the patch introduced between one of the sections and the outer face of the hose, so that when the ends of the sections are drawn together, the opening in the hose will be securely closed.

In applying my improved clamp to use, the nut 12 is removed from the bolt 11 and the sections of the clamp separated or swung on their pivot pin and positioned around the hose, after which the bolt is again inserted through the openings in the ears and the nut turned on the end of the bolt until the proper degree of pressure is brought to bear to securely clamp the hose in position and prevent leakage between the hose and coupling.

It will thus be seen that I have provided a very cheap and economical form of clamp and one that can be readily and quickly applied to use and it will likewise be seen that the clamp may be used for applying a patch to hose, as well as for securing the hose to an object and that the terminals at the meeting ends of the sections of the clamp will prevent buckling or bulging of the hose and at the same time add strength to the ears in rendering the same more rigid.

What I claim is:

1. A clamp of the class described comprising a pair of curved sections, means to hingedly secure said sections together, the terminals of said sections being bent downwardly and resting on the faces of the sections, ears extending upwardly from said terminals and means to draw said ears together whereby the sections will be clamped around an object.

2. A clamping device of the character described comprising the combination with a hose and a shank in said hose; of a clamp formed in sections, means to hingedly secure said sections together, the terminals of said sections being bent outwardly and resting on the faces of said sections, ears integral with the outer ends of said terminals and an adjusting bolt adapted to draw said ears towards each other and clamp the sections around the hose.

In testimony whereof I have signed my name to this specification in the presence of two subscribing witnesses.

JOHN FRANCIS GERO.

Witnesses:
  P. M. BRILL,
  JOHN EATON.